US012783558B2

(12) United States Patent
Matei et al.

(10) Patent No.: US 12,783,558 B2
(45) **Date of Patent: *Nov. 3, 2026**

(54) MACHINE LEARNING FOR SIMILARITY SCORES BETWEEN DIFFERENT DOCUMENT SCHEMAS

(71) Applicant: Oracle International Corporation, Redwood Shores, CA (US)

(72) Inventors: Liviu-Sebastian Matei, Bucharest (RO); Filip Torjan, Beroun (CZ)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/091,846

(22) Filed: Mar. 27, 2025

(65) Prior Publication Data

US 2025/0284715 A1 Sep. 11, 2025

Related U.S. Application Data

(63) Continuation of application No. 17/898,173, filed on Aug. 29, 2022, now Pat. No. 12,265,561.

(60) Provisional application No. 63/239,798, filed on Sep. 1, 2021.

(51) Int. Cl.
*G06F 16/332* (2019.01)
*G06F 16/334* (2025.01)

(52) U.S. Cl.
CPC ...... *G06F 16/3326* (2019.01); *G06F 16/3346* (2019.01)

(58) Field of Classification Search
None
See application file for complete search history.

(56) References Cited

U.S. PATENT DOCUMENTS

| | | | | |
|---|---|---|---|---|
| 6,269,368 | B1 * | 7/2001 | Diamond | G06F 16/3326 707/999.005 |
| 7,272,593 | B1 * | 9/2007 | Castelli | G06F 16/3326 707/999.005 |
| 7,912,701 | B1 * | 3/2011 | Gray | G06F 16/3344 704/7 |
| 8,005,823 | B1 * | 8/2011 | Marshall | G06F 16/2455 707/769 |
| 11,983,244 | B1 * | 5/2024 | Zhdanov | G06F 16/686 |
| 2007/0208730 | A1 * | 9/2007 | Agichtein | G06F 16/337 707/999.005 |

(Continued)

*Primary Examiner* — Son T Hoang
(74) *Attorney, Agent, or Firm* — Kilpatrick Townsend & Stockton LLP

(57) ABSTRACT

A document repository may be searched for documents that are similar to a source document. Multiple queries may be generated based on a type of the source document, and the results may be combined in a unified response. User behavior may then be monitored, and implicit and explicit feedback may be gathered to evaluate the performance of the search. The gathered feedback may indicate how relevant each of the result documents are in comparison to the original source document. This feedback may then be used to adjust search parameters for the source document type, such that the performance of subsequent searches may be improved. A model may also be trained to classify implicit feedback using explicit feedback received from users.

18 Claims, 15 Drawing Sheets

(56) References Cited

U.S. PATENT DOCUMENTS

| | | | | |
|---|---|---|---|---|
| 2012/0278341 | A1* | 11/2012 | Ogilvy | G06F 16/313<br>707/748 |
| 2013/0290339 | A1* | 10/2013 | LuVogt | G06F 16/9535<br>707/E17.089 |
| 2015/0169584 | A1* | 6/2015 | Kwok | G06F 16/951<br>707/730 |
| 2017/0091319 | A1* | 3/2017 | Legrand | G06F 16/93 |
| 2019/0057095 | A1* | 2/2019 | Chakravarti | G06F 16/24578 |
| 2022/0004553 | A1* | 1/2022 | Corvinelli | G06F 16/24549 |
| 2022/0215446 | A1* | 7/2022 | Jiang | G06F 16/58 |

* cited by examiner

MACHINE LEARNING FOR SIMILARITY SCORES BETWEEN DIFFERENT DOCUMENT SCHEMAS

CROSS-REFERENCES TO RELATED APPLICATIONS

This application is a continuation of U.S. application Ser. No. 17/898,173 filed Aug. 29, 2022, which is incorporated herein by reference. U.S. application Ser. No. 17/898,173 claims the benefit of U.S. Provisional Application No. 63/239,798, filed on Sep. 1, 2021, which is incorporated herein by reference.

BACKGROUND

Document repositories may include a large number of documents in a persistent storage system. These documents may include structured and unstructured data, and may conform to many different schema types. For example, a document repository representing a knowledge base may include FAQs, white papers, webpages, emails, and/or other information that may be used to address various problems in an operating environment. While the document repository may store a great deal of information, it is also very difficult to search this information effectively, as the document repository may include many different document types that are difficult to uniformly analyze.

An existing method of identifying documents that may be relevant to a source document is to generate a similarity score. A similarity score is a metric calculated by a search interface of the repository that represents a measure of how syntactically similar two documents may be. A source document may be compared to each of the individual documents in the document repository to generate a similarity score for each document in the repository. These scores can then be used to identify documents that are most likely to be similar to the source document.

SUMMARY

A document repository may be searched for documents that are similar to a source document. Multiple queries may be generated based on a type of the source document, and the results may be combined in a unified response. User behavior may then be monitored, and implicit and explicit feedback may be gathered to evaluate the performance of the search. The gathered feedback may indicate how relevant each of the result documents are in comparison to the original source document. This feedback may then be used to adjust search parameters for the source document type, such that the performance of subsequent searches may be improved. A model may also be trained to classify implicit feedback using explicit feedback received from users.

A document repository may be made up of documents having many different schemas to be searched and compared to an input document to generate a similarity score. The similarity score can be used to identify documents in the document repository that are most similar to the input document. The schema of the input document can be identified and used to retrieve a configuration specific to that schema. The configuration may include information that defines how queries can be automatically generated and submitted to the document repository such that a search can be performed between different fields in documents with different schemas. These queries can be concatenated and submitted to the document repository. The weighted scores generated for the result documents can be aggregated together to generate a final similarity score for each document.

Instead of merely searching documents for syntactic similarity, the configuration allows the queries submitted to the document repository to be more likely to generate semantic similarities, such that the meanings or concepts expressed in the documents are more likely to be similar. The configurations can be tailored to specifically map high-frequency n-grams in specific source fields to specific target fields in documents having specified schemas in the document repository.

The document repository may be designed to include an interface that allows for document indexing. An existing document repository may be crawled and/or documents may be submitted that are indexed into an inverted index. The data cleanup process may remove extraneous information or metadata that is not related to the semantic meaning of the documents before indexing takes place. The system may also include a search interface for the inverted index as well as a document frequency API that can be used to retrieve a document frequency for specific words. This document frequency may be used to generate a frequency score for individual words. This frequency score may be used to select which words in the target field are used for generating search queries.

The configuration itself may include separate sections for each schema that may be used as a source for the search queries. Search fields from the target document can be used to provide individual n-grams or other field values from the source field to generate a specified number of queries that can be concatenated together to form a single query. The resulting similarity scores may be weighted according to a value stored in the configuration. The various mappings between source fields and target fields—and between different schemas in the knowledge repository—may be aggregated together to form a final similarity score for each document. These similarity scores may then be used to order or present the results to the requesting user or device.

After the search is completed, user behavior may be observed with the resulting documents returned from the search. For example, implicit user feedback may be recorded, such as "dwell time." The longer a user "dwells" on a returned document, the more relevant that document may be to the source document. However, it is difficult to classify a document based on the implicit feedback alone. Therefore, some embodiments may also collect explicit feedback, such as an explicit indication from the user as to whether the result document is relevant to the source document. The explicit feedback may then be used to train a model or neural network that classifies implicit feedback. Implicit feedback may then be passed as an input to the model in order to classify the document as being relevant or not without requiring explicit feedback in all cases.

Once feedback is used to classify the document as relevant or not, parameters may be altered or adjusted in the configuration that is used to generate the queries for that document type. For example, configuration parameters may include parameters that indicate a number of shingles or n-grams to be used in the search, weights to be used for each query, a number of queries to be generated in the search, and so forth. Using the adjusted parameters, new search scores may be generated for the result documents, and these new results may be compared to the previous result. If the results of the search are better, then the adjusted parameters may replace the old parameters in the configuration for subsequent searches. If the results are not better, the system can revert back to the original parameters in the configuration and modify other parameter values until the results are improved. The results may be evaluated using an objective function that characterizes a search error.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

The embodiments described herein allow a document repository comprised of documents having many different schemas to be searched and compared to an input document to generate a similarity score. The similarity score can be used to identify documents in the document repository that are most similar to the input document. The schema of the input document can be identified and used to retrieve a configuration specific to that schema. The configuration may include information that defines how queries can be automatically generated and submitted to the document repository such that a search can be performed between different fields in documents with different schemas. These queries can be concatenated and submitted to the document repository. The weighted scores generated for the result documents can be aggregated together to generate a final similarity score for each document.

Figure 1:
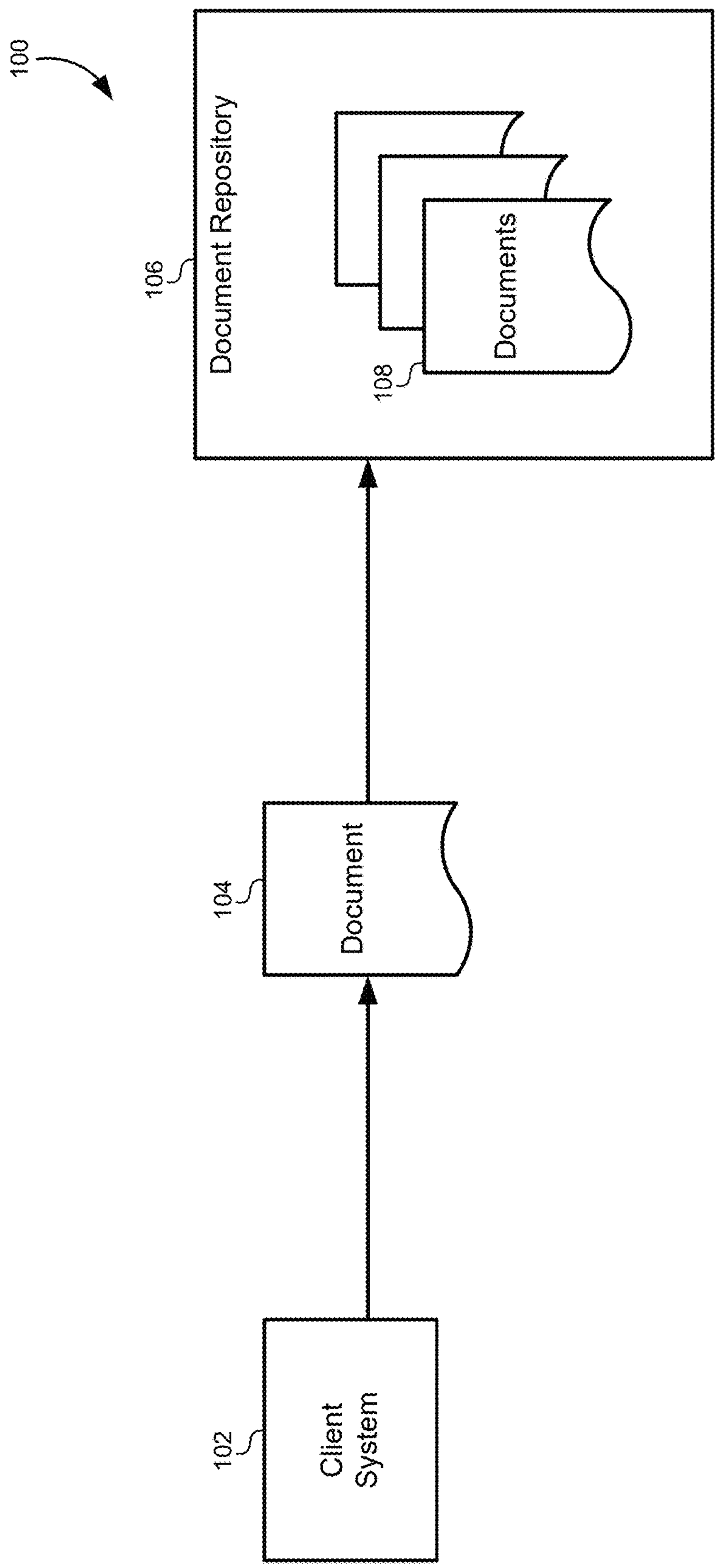
FIG. 1 illustrates a system for submitting a document to a document repository to generate similarity scores, according to some embodiments.

FIG. 1 illustrates a system 100 for submitting a document 104 to a document repository 106 to generate similarity scores, according to some embodiments. A client system 102 may submit a document 104 to a server, a web-based system, or cloud-based system which may be referred to generically as a "server" or "server system." The document 104 may represent any type of document, including structured and/or unstructured data. By way of example, the document 104 may represent an incident report or trouble ticket received by an incident-management system. The document 104 may be generated by the client system 102. Alternatively, the document 104 may be generated by the server that manages the document repository 106 and/or operates the incident management system in response to information submitted by the client system 102. For example, the client system 102 may submit information from a web form that is used to populate fields in the document 104 to generate an incident report either by the client system 102 or by the incident management system.

The document 104 may be received by the server system in order to find a document in the document repository 106 that is responsive to the information in the document 104. Continuing with the example of the incident-management system, the document 104 may represent a description of a problem or other incident relating to a service provided by a service provider. The document repository 106 may include documents 108 such as white papers, solutions to common problems, knowledge-base articles, and other information that may be responsive to the problem described in the document 104 and/or other problems that have previously been handled by the system. The similarity score represents a metric that indicates how closely the information in the document 104 is related to information in each of the documents 108 in the document repository 106. The higher the similarity score, the more likely one of the particular documents 108 provides information related to the topic of the document 104.

In a system such as this, similarity scores calculated by existing systems may simply execute comparison algorithms between the document 104 and the documents 108 in the document repository 106 to compare individual words. This can be very effective for finding a document in the document repository 106 that is syntactically similar to the document 104. However, a technical problem exists in that existing methods do not find a document in the document repository 106 that is semantically similar to the meaning expressed by the document 104. For example, existing techniques may identify documents 108 that use similar terminology as the document 104, but which are not related to a specific problem that is expressed in the semantics of the document 104. Another technical problem exists in that existing techniques do not intelligently map language from specific fields in the document 104 to other specific fields in the documents 108. Because semantic ideas may be expressed differently in different fields, and because matching ideas both particular source and target fields should be weighted more heavily than others, existing techniques often miss key connections between the ideas expressed in the document 104 and the documents 108.

The embodiments described herein solve these and other technical problems by using defined configurations that instruct the system how to generate intelligent queries that are able to link the meaning of the information expressed in the source of document 104 to the meanings in the identified documents 108 in the document repository 106 that are more likely to solve a problem expressed by the document 104. Additionally, these embodiments solve the technical problem of generating accurate comparisons and similarity scores between documents having different schemas. In structured documents, comparisons between all fields in the various documents may be inefficient and cumbersome. These embodiments provide targeted queries between specific fields between different schemas. Because information may be stored in different fields in different documents, the configurations define target fields and corresponding source fields where the information comparison will be most effective.

Figure 2:
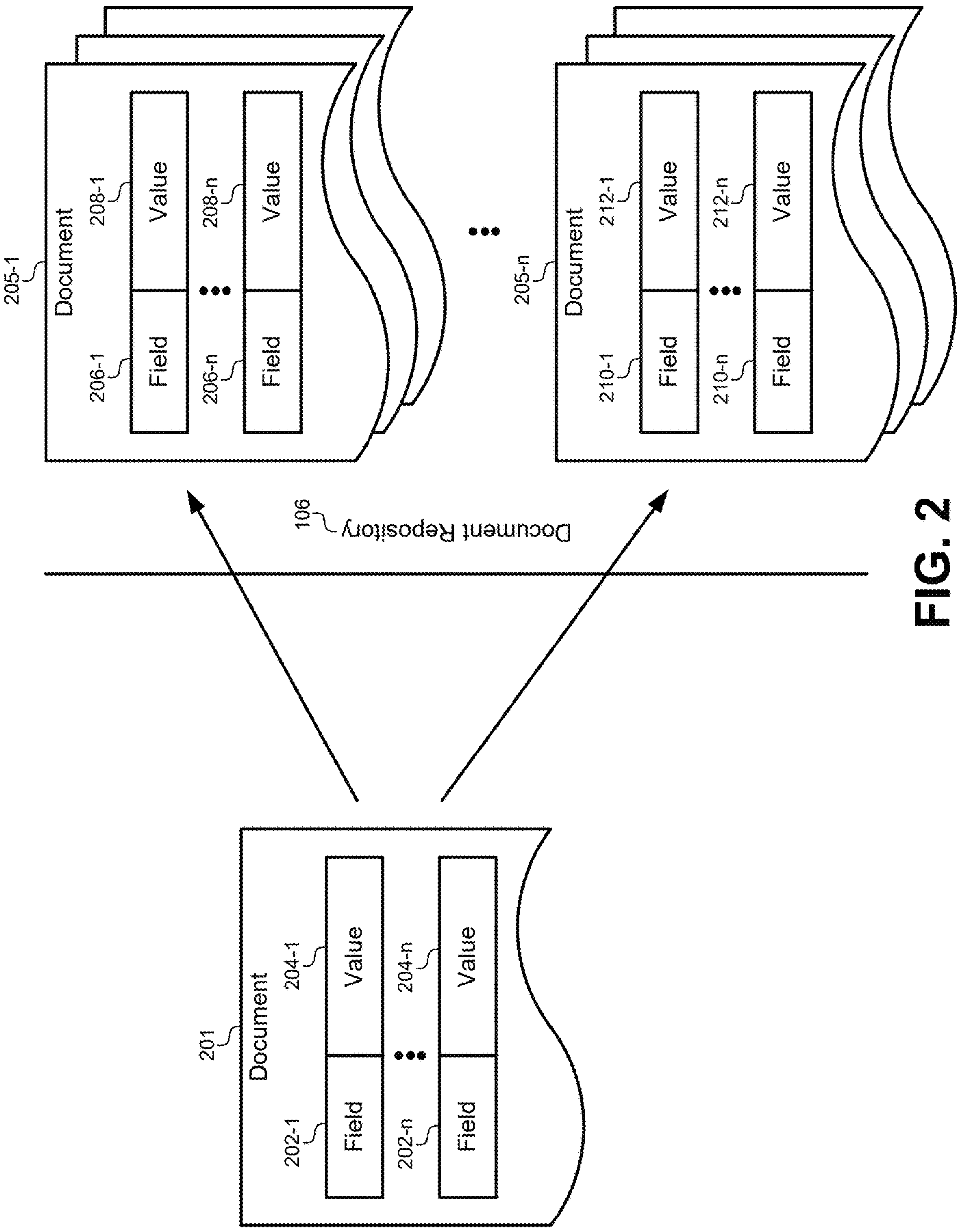
FIG. 2 illustrates collections of documents having different schemas, according to some embodiments.

FIG. 2 illustrates collections of documents having different schemas, according to some embodiments. A document 201 received by the document repository 106 may have a first schema. As defined herein, a "schema" may refer to a structure of the document 200. For example, a schema may define a number of field-value pairs to be found in the document 201. Each of the fields 202 may be associated with corresponding values 204 that may be specific to each document instance. The fields 202 may define data types for the values 204. For example, a first field 202-1 may include a label, such as a "user name," and may define a type as a "text string" such that the corresponding first value 204-1 may include a text string with a specific value for the user name. The first schema of the document 201 may define all of the field-value pairs, while individual documents using the schema may define specific values for the corresponding field-value pairs. The schema may also define other structural elements of the document, including styles, images, backgrounds, divisions, static text, and other document elements.

As used herein, the terms "first" and "second" are used merely to distinguish between various elements, such as different schemas. These terms do not imply order, precedence, importance, or any other characteristic of these elements, but instead serve only to distinguish one element from another element. For example, a first schema and a second schema may refer to two documents having individual schemas. The first scheme and the second schema may be the same or different schemas, such that both documents have the same schema or have different schemas.

Difficulties have traditionally arisen when the document 201 is submitted to the document repository 106. The document repository 106 may include a plurality of collections of documents 205. Each of the collections of documents 205 may be associated with individual schemas. For example, collection 205-1 may be associated with a first schema, and each document in collection 205-1 may share the same first schema. Other collections **205-*n* may each include different schemas. In traditional systems, the document 201 could only be compared to other documents in the document repository 106 that share the same schema. This allowed the similarity comparisons to be made between corresponding values in the field-value pairs. However, this greatly reduced the number of documents in the document repository 106 that could be accurately responsive to a request to generate a similarity score for the document 201. The embodiments described herein are able to generate similarity scores that match semantically between the document 201 having a first schema and any collection of documents in the document repository 106** having a second schema.

Figure 3:
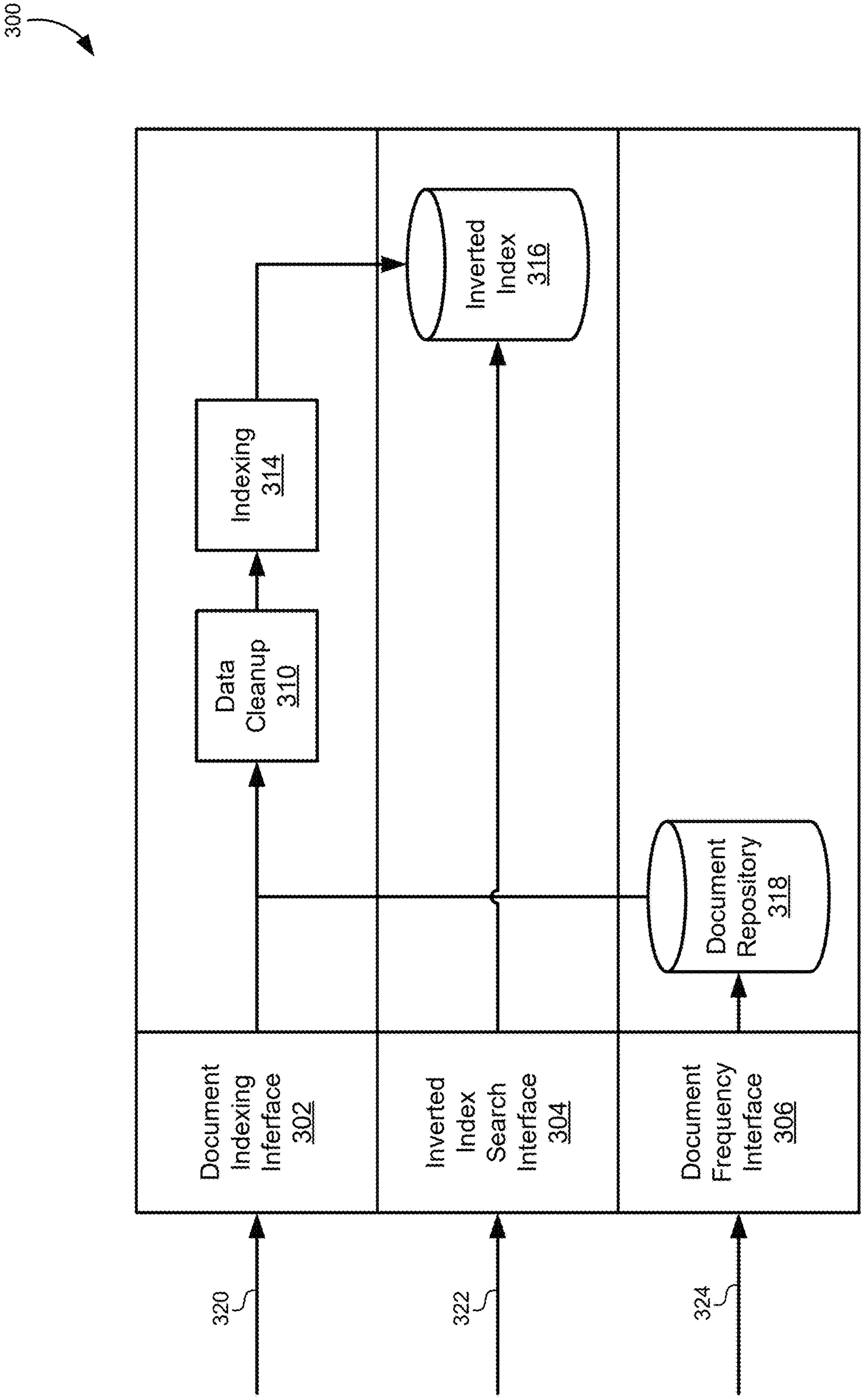
FIG. 3 illustrates a system for the document repository that may be used when generating queries for the similarity score process, according to some embodiments.

FIG. 3 illustrates a system 300 for the document repository that may be used when generating queries for the similarity score process, according to some embodiments. The system 300 may first include a document indexing interface 302. The document indexing interface 302 may receive a request 320 to index a new document being added to the document repository. Additionally, the document indexing interface 302 may access existing documents in an existing document repository 318 to crawl and index the documents in the document repository 318. A data cleanup process 310 may be used to remove information from the document that is not related to the semantic meaning of the document before the indexing process takes place. For example, the data cleanup process 310 may perform various data cleanup steps, such as the removal of JavaScript, HTML code, CSS code, and other code or elements related to the display of the document, the structure or format of the document, or other metadata. After the data cleanup process 310, the document may be provided to an indexing process 314 that generates a reverse index or inverted index 316 for the document repository 318.

The inverted index 316 stores a list of each document in the document repository 318 that includes a particular word. An inverted index may include a database index storing a mapping from content, such as individual words, to its locations in a set of documents (in contrast to a forward index, which maps from documents to content). The purpose of an inverted index is to allow fast full-text searches, at a cost of increased processing when a document is added to the document repository 318. The system may also include an inverted index search interface 304 allows the system 300 to receive a request 322 querying the inverted index 316. The request 322 may include a word found in one or more documents in the document repository 318. The inverted index 316 may access the listing for the particular word and return a list of documents that include that word. The embodiments described herein may also allow the request 322 to specify a specific field in each document. For example, the request 322 may include a word to be searched in an SUBJECT field in a particular document schema. The inverted index 316 may be generated such that it is associated with a specific collection of documents all having same schema. Alternatively, the inverted index 316 may be generated such that collections of documents having individual schemas can be searched and indexed as collections separate from each other. The inverted index 316 may be searched using queries that include Boolean queries, phrase queries, word queries, single-value queries, and/or any other type of query.

The system 300 may also include a document frequency interface 306. This interface may be implemented using an Application Programming Interface (API) that retrieves a document frequency. The document frequency interface 306 or API may search the document repository 318 for a given word to retrieve the number of documents in which that word can be found. In some embodiments, the document frequency may be used to generate a document frequency score for a particular word. This score may be generated as (1) a measure of how often the particular word is found in the source document, multiplied by (2) an inverse measure of how many documents in the particular document collection include the word. The frequency score for a particular word may be used to generate queries as described in detail below.

In some embodiments, a system 300 with each of the interfaces described above may be implemented using the Apache® SOLR software, or may be built on top of the Apache® Lucene search system. However, these particular software solutions are provided only by way of an enabling example and are not meant to be limiting. Many other software systems may be used for which similar features may be implemented as described herein.

Figure 4:
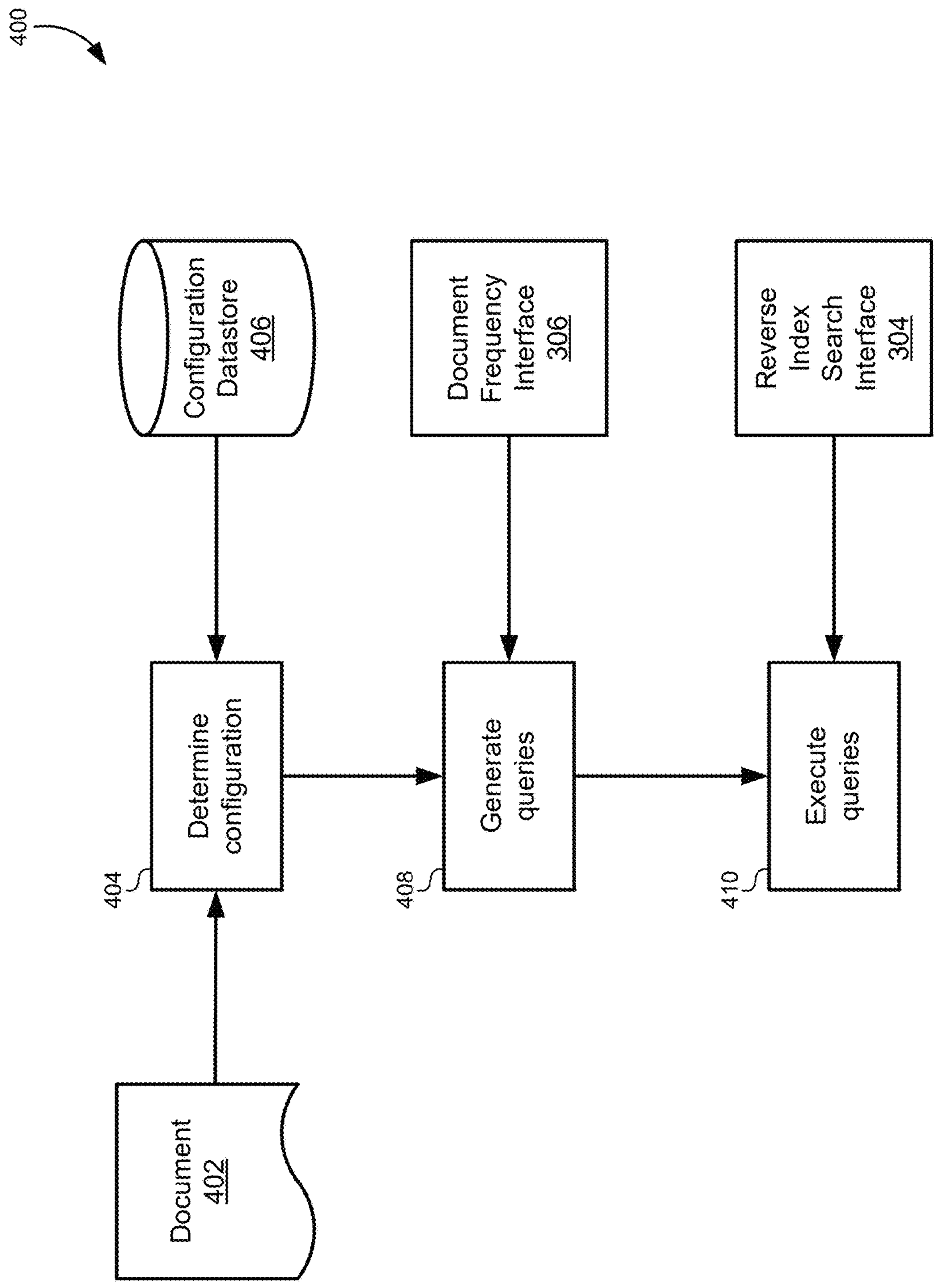
FIG. 4 illustrates a diagram of a similarity scoring system, according to some embodiments.

FIG. 4 illustrates a diagram of a similarity scoring system 400, according to some embodiments. The process executed by the similarity scoring system 400 may assume that a document repository has been properly indexed and processed as described above in relation to FIG. 3. Thus, the similarity scoring system 400 may submit requests to the various interfaces described above to receive document frequencies and perform searches of the inverted index.

A document 402 may be submitted to the similarity scoring system 400. The document 402 may be received from a client device and may represent any type of document, such as an incident report as described above in the example of FIG. 1. The similarity scoring system 400 may determine a specific configuration associated with a document 402 (404). For example, a configuration data store 406 may store configurations associated with each type of schema that may be received by the system or that may be stored in the document repository. The schema of the particular document 402 may be determined by examining the metadata or by identifying and matching the field-value pairs in the document 402 to a known schema. When the schema is identified, the schema may be submitted to the configuration data store 406 to retrieve a configuration that is specific to that schema. Thus, the configuration data store 406 may store configurations for each schema defined in the similarity scoring system 400.

The similarity scoring system 400 may then generate a plurality of queries based on the configuration (408). A specific example of a configuration and how the configuration may be used to generate a plurality of queries is described below in relation to FIGS. 5A-5B. Generally, a configuration may include a set of fields that can be used as instructions for generating the queries from the source schema of the document 402. The queries may target any of the schema types stored in the document repository. For example, if the document 402 has schema A, the configuration may include fields that act as instructions for generating a set of queries between a document having schema A and a document having schema A, between the document having schema A and a document having schema B, and so forth. Thus, a configuration may include instructions that map queries from the schema of the source document 402 to a plurality of other schemas that may be present in the document repository.

Generating the queries may include receiving a document frequency score from the document frequency interface 306 described above. The document frequency score may be used to generate queries that are most likely to generate responsive answers. For example, the document frequency score may be used to generate queries for words in the source document 402 that are most likely to be found in the document repository. A plurality of queries may be generated for each field-to-field combination between the source document 402 and fields in the particular schema indicated by the configuration.

The similarity scoring system 400 may then execute the queries (410). These queries may be submitted together as a union (e.g., "OR") set of queries that are submitted to the reverse index search interface 304. For example, some embodiments may create a master query that combines all of the queries together. This query may be executed, and the returned documents may receive a score. As described below, the configuration may include a weight that is applied to each score. The score returned by the search may apply the weight to the score from the index. For example, some search interfaces may receive a weight that boosts the return score as a multiplier. These scores can then be aggregated together for each document to generate a final similarity score for each document. Note that some embodiments need not normalize the scores, but instead the weighted scores may be used to compare documents to each other, which need not require normalization. The scores may then be displayed and/or used to order results for documents that are presented to the requesting client system or a user interface.

Figure 5A:
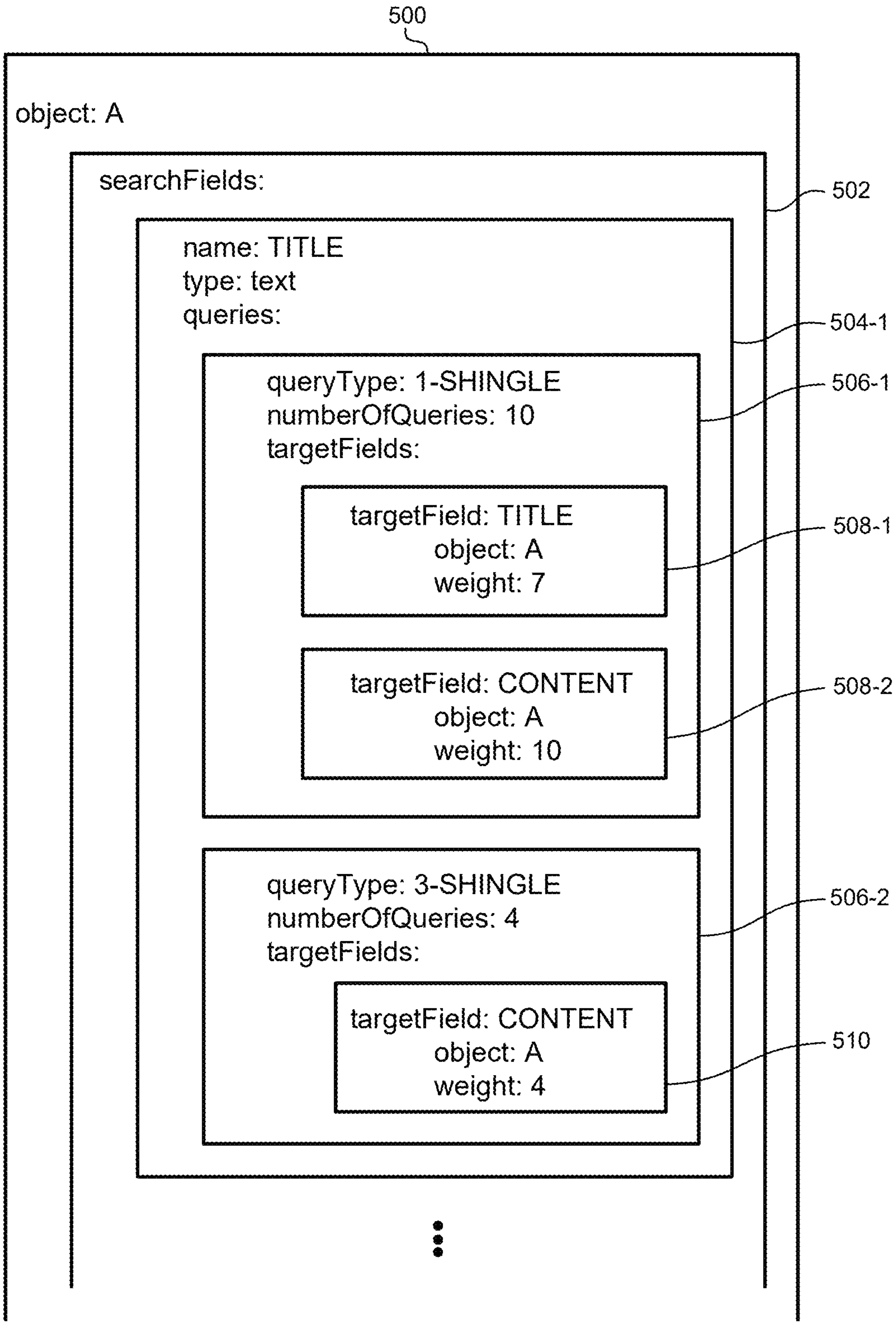
FIGS. 5A-5B illustrates an example of a configuration for a particular schema, according to some embodiments.
Figure 5B:
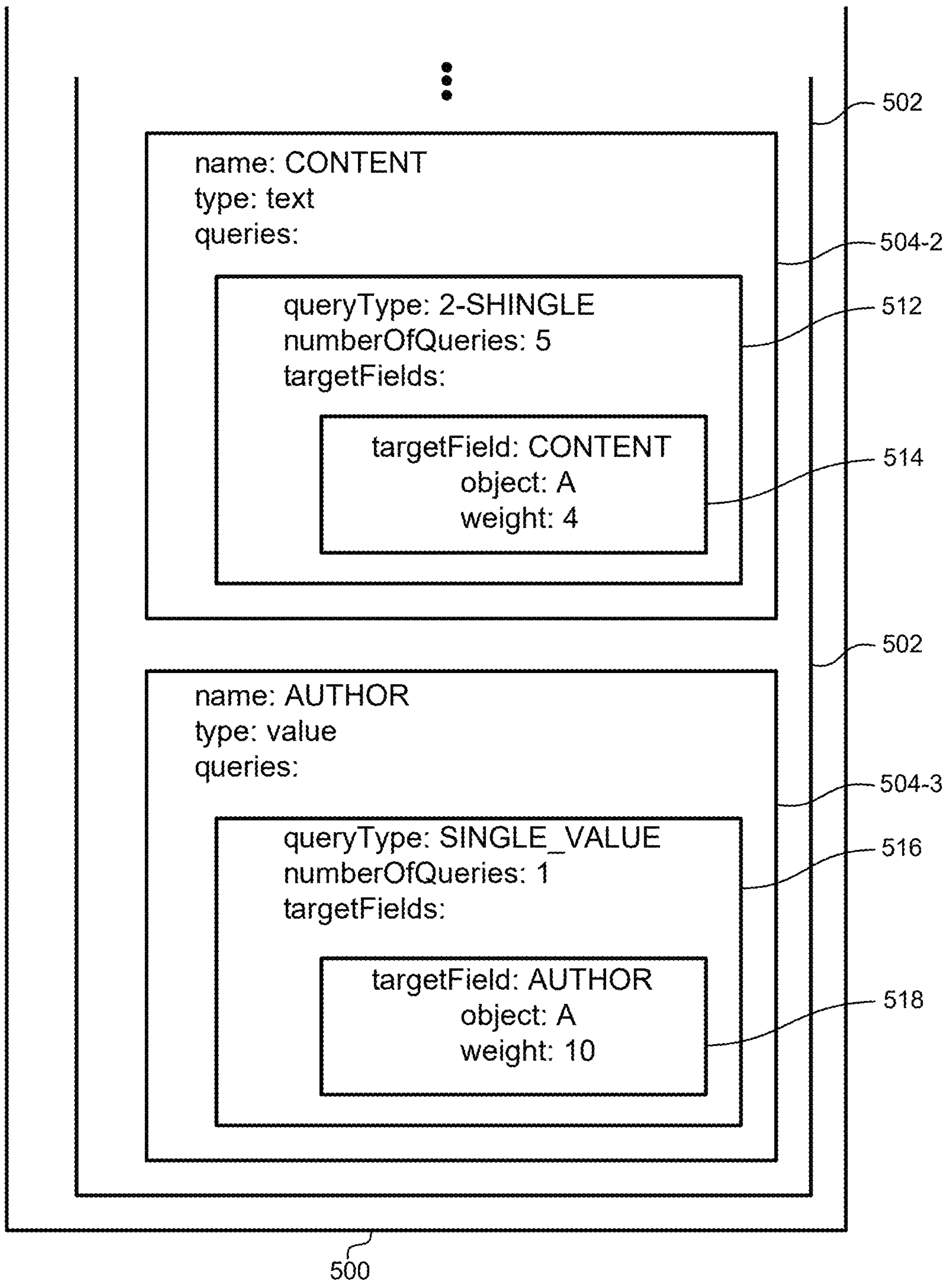

FIGS. 5A-5B illustrates an example of a configuration 500 for a particular schema, according to some embodiments. In this example, the configuration 500 has been selected for source document having schema A. The schema itself may be an object that has an object type that can be used to identify the configuration 500 from a plurality of different configurations associated with different source document schemas. The configuration 500 may be part of a larger configuration file that defines many different configurations for different schemas. The configuration 500 may be stored as a structured document, such as XML.

The configuration 500 may be used to generate a plurality of search fields 502 that can be executed as queries on the document repository. The search fields 502 may use the source fields 504 in schema A as sources for queries. In this example, a first source field 504-1 may identify the TITLE field of the source document and use words in the TITLE field to search different fields in a specified schema type in the document repository. The TITLE field may have a type of "text" indicating that it stores a text string. Each of the queries generated for the first source field 504-1 may use words from the first source field 504-1 as a source when building the queries. For each schema, one or more of the source fields 504 in the schema may be identified by the configuration and used to generate queries. For example, in addition to the TITLE field, a second search field 504-2 may identify the CONTENT field, and a third source field 504-3 may identify the AUTHOR field as sources for schema A.

In a source field, the configuration 500 may identify different query types 506. Each of the query types 506 may identify a number of words to be used for each query. For example, a first query type 506-1 may identify the type as 1-SHINGLE to instruct queries that match n-grams of order "1" (i.e., 1-grams) from the source filed to the different target fields in the target schemas. A second query type 506-2 may identify the type as a 3-SHINGLE to search on 3-grams from the source TITLE field in schema A. Another query type 516 may identify a type as a SINGLE_VALUE type indicating that a single value from the source should be matched to the single value in the target field. For example, the name of an author may be required to match exactly between source and target fields.

The query types 506 may also identify a number of queries to be generated. For example, the second query type 506-2 may identify four queries to be generated as 3-grams from the source TITLE field of schema A. To determine which of the 3-grams from the TITLE field to use, the system may query the document frequency interface described above to retrieve a document frequency for each word in each of the 3-grams in the TITLE field. Queries may then be generated using the 3-grams that generate the highest document frequency score is a combination of the individual frequency scores of the individual words. As described above, the document frequency score may be a product of how often the words of the particular 3-gram appear in the source (TITLE) field and an inverse of how many documents in the document repository contain the words of the 3-gram.

Finally, each of the query types may identify one or more queries 508, 510, 514, 518 that may be generated for each query type. For example, a first query 508-1 may be comprised of 10 individual queries according to the first query type 506-1. Each of the individual queries may correspond to 1-grams (e.g., individual words in the TITLE field) with the highest document frequency score. The queries may target specific fields in specific schemas in the document repository. For example, the first query 508-1 may generate 10 queries that each search a different word in the TITLE field of documents in the document repository having schema A. Note that the example schema in FIGS. 5A-5B search fields from schema A against fields from other documents having the same schema A the document repository. However, this is provided only by way of example and is not meant to be limiting. The configuration 500 may also include other queries that target objects having different schemas (e.g. schema B) that are not specifically illustrated in these figures.

To generate the query 508-1, the 10 single words with the highest frequency score may be combined with an "OR" operator to form a single query that searches the TITLE field in schema A for any of those single words. The resulting scores generated by this query for each document can be multiplied by the weight (e.g., 7). This weighting allows the configuration to specify matches between fields that more strongly indicate a similarity in semantic meaning. Finally, each of the one or more queries 508, 510, 514, 518 may be concatenated, combined, and/or submitted to the index to generate weighted similarity scores. In some embodiments, the weight may be set by a user, or may be set automatically by a machine-learning model.

Figure 6:
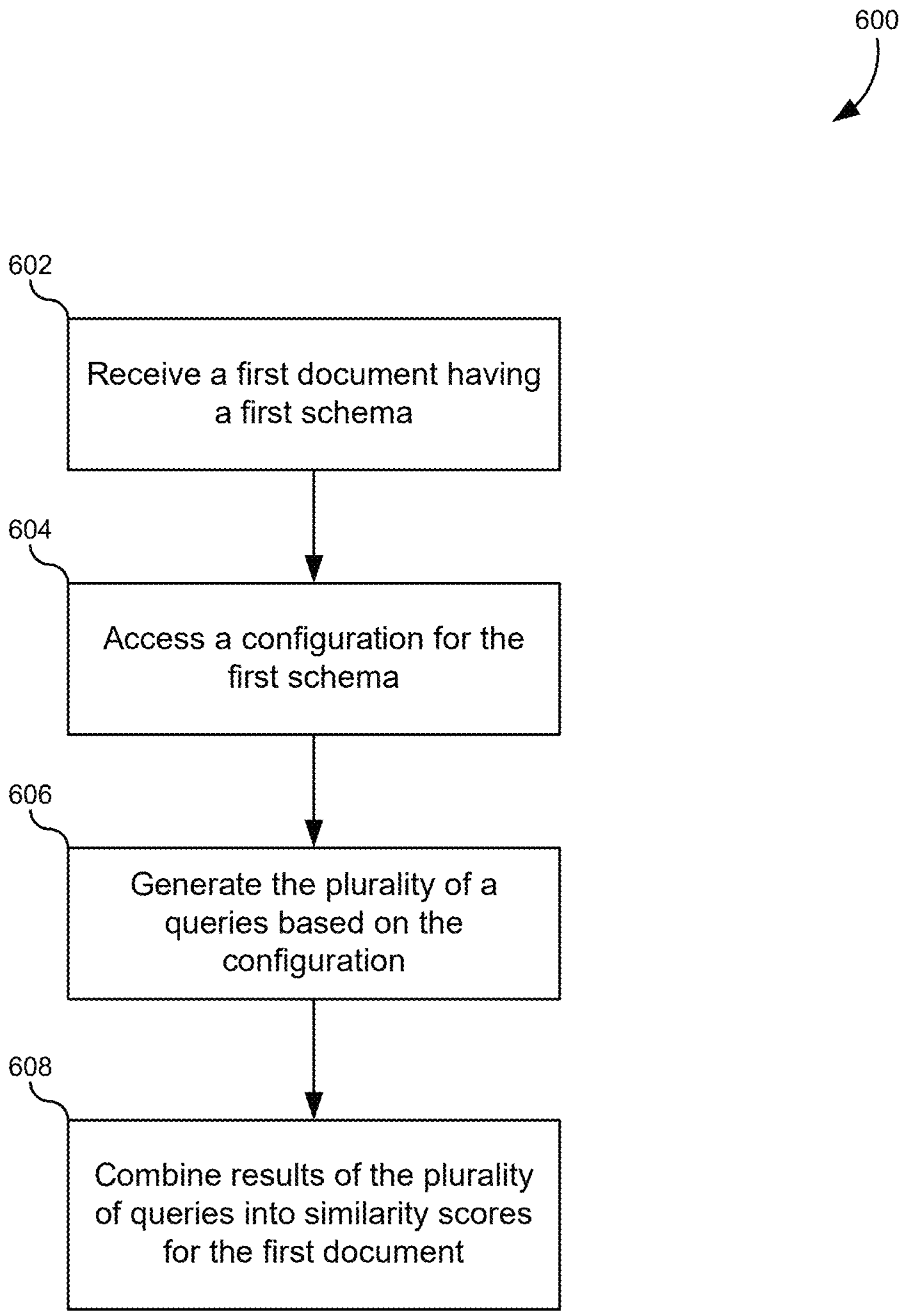
FIG. 6 illustrates a flowchart of a method for calculating similarity scores for documents, according to some embodiments.

FIG. 6 illustrates a flowchart 600 of a method for calculating similarity scores for documents, according to some embodiments. The method may include receiving a first document having a first schema (602). The document and the first schema may be received as described above in FIGS. 1-2. For example, the first schema may define the format for service requests received by an incident management system, among other example operating environments.

The method may also include accessing a configuration for the first schema (604). The configuration may define how to generate, from the first document, a plurality of queries into a collection of documents having a second schema. The second schema may be the same as the first schema or different from the first schema. As described above in FIGS. 5A-5B, the schema may define field-value pairs in document formats, value types, field names, metadata, and/or other information related to the structure or format of the document. In specific examples, the configuration may include a query type defining an n-gram level (e.g., 1-gram, 3-gram, etc.) for some of the queries to be generated. Configuration may also include a number of queries to be generated for each query type, where the words or n-grams selected for the queries are based on a frequency score. The frequency score may represent a product of a number of times a word appears in a source field and an inverse of a number of documents in which the word appears in the document repository.

The method may further include generating the plurality of queries based on the configuration (606). The plurality of queries may be concatenated together using union or "OR" operators to form a single query that may be executed against the document repository. The document repository may include collections of documents having different schemas that are part of a knowledge base. The method may additionally include combining results of the plurality of queries into similarity scores for the first document (608). The results of each of the queries may be weighted according to the weights provided in the configuration. The individual scores for each target document may then be combined into a single similarity score for each document as a weighted combination, and the scores may be used to order or present result documents for the user or client device.

It should be appreciated that the specific steps illustrated in FIG. 6 provide particular methods of generating similarity scores according to various embodiments. Other sequences of steps may also be performed according to alternative embodiments. For example, alternative embodiments may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. Many variations, modifications, and alternatives also fall within the scope of this disclosure.

Machine Learning for Similarity Scores

The system described above uses new techniques to calculate similarity scores between an input document and a collection of documents having different document types. This section describes an improvement on this system that uses trained models and learning algorithms to improve the similarity engine described above based on user feedback. Given a document repository or a collection of documents, the document similarity engine may identify documents in the collection that are most similar to the input document as described above. These improvements further use a "learning to rank" machine learning technique to improve this similarity score calculation. Specifically, the learning to rank technique may be used to modify scoring parameters to calculate more accurate scores for the list of similarity documents based on user feedback.

As described above, a document may be defined as a collection of key-value pairs. The values can include any type of value, such as date values, string values, numeric values, text values, Boolean values, and so forth. The embodiments described herein do not impose any limits on the type or text quantity used in these value fields. A document category or class is a set of documents that share the same structure for the same set of fields that make up the document schema. Thus, each document in a document class may defined as using the same schema. The entire collection of documents may include many different categories or classes of documents, with each class or category comprising a plurality of different individual documents in the document repository.

Figure 7A:
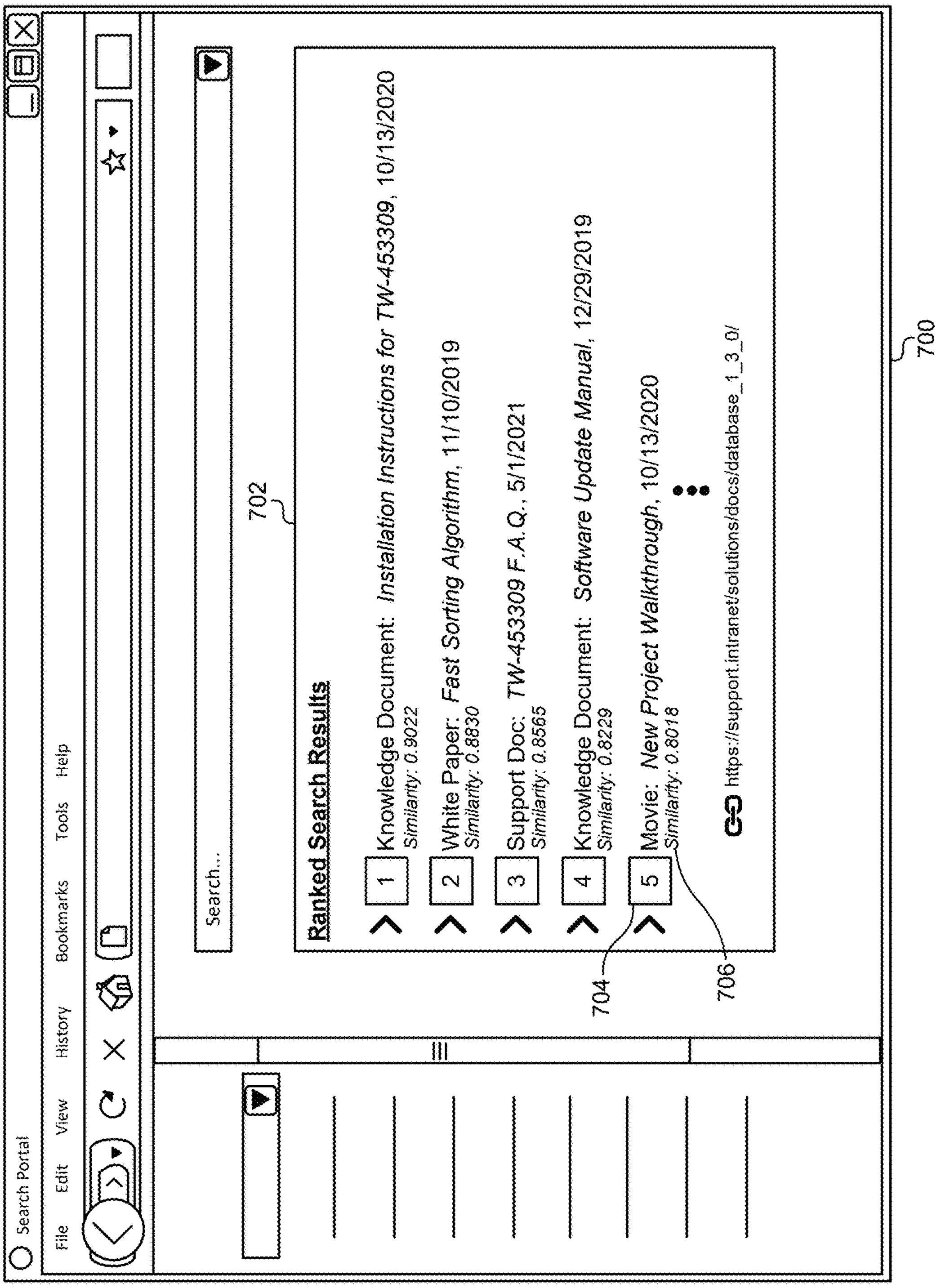
FIG. 7A illustrates an example of a user interface that displays the results of the document similarity engine, according to some embodiments.

FIG. 7A illustrates an example of a user interface 700 that displays the results of the document similarity engine, according to some embodiments. Given an input document that belongs to a category $C_1$, and which category $C_1$ is associated with a schema $S_1$, the system may be used to identify an ordered list of documents from one or more categories, $C_1$, $C_2$, $C_3$, etc., that are associated with corresponding schemas $S_1$, $S_2$, $S_3$, etc., that are most similar to the input document. An ordered list of documents 702 may then be presented to a user in the user interface 700. The list of documents 702 may include information 706 that identifies the document, the document type, a summary of the document contents, and/or other document information. Some embodiments may also display a rank or similarity score 704 as part of the information displayed to the user, although this rank or similarity score 704 is entirely optional, depending on the embodiment. The initial display of the list of documents 702 may be based on the results from the document similarity engine using the techniques described above.

However, even though the document similarity engine described herein represents a distinct improvement over previous methods of calculating document similarity, some users may not necessarily agree with the results. For example, a user may click on one of the documents that is highly ranked by the document similarity engine only to discover that the document similarity is not as expected. Therefore, the user may use the list of documents 702 to ultimately judge the similarity of the documents in relation to the input document. In order to make use of the user-based interactions with the user interface 700 that further characterize the similarity of the documents in the list of documents 702, the user interface may include user controls that are configured to receive user feedback. This user feedback can then be used to train or retrain models or to influence a learning to rank algorithm to improve the document similarity score calculations.

Figure 7B:
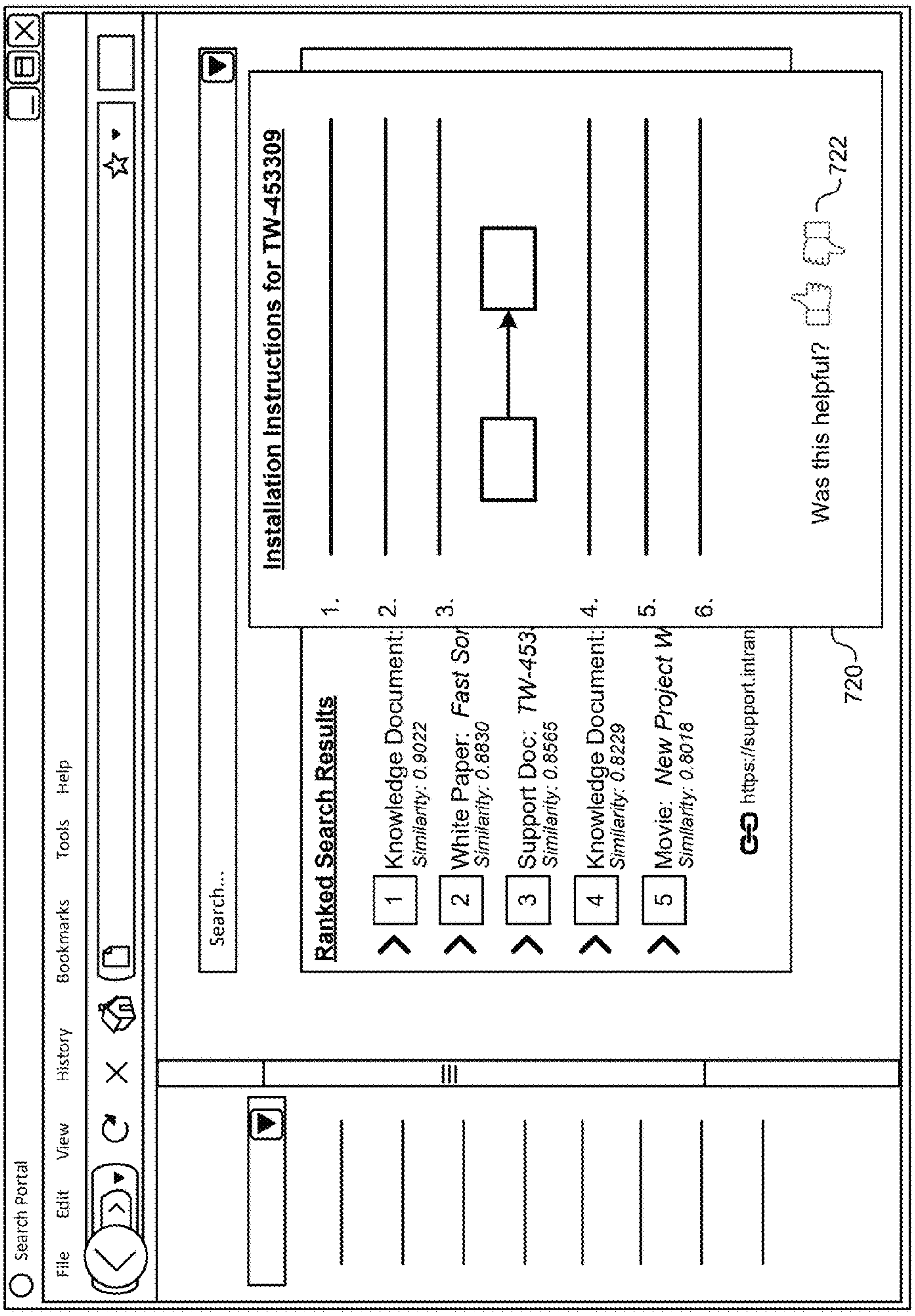
FIG. 7B illustrates how both implicit and explicit feedback may be received from users, according to some embodiments.

FIG. 7B illustrates how both implicit and explicit feedback may be received from users, according to some embodiments. A user may be allowed to select one of the documents from the list of documents 702 for further inspection and evaluation. The user interface 700 may include controls or functions that allow the user to select one of the documents in the list of documents 702 and view the contents of the document. For example, the list of documents 702 may include clickable links, preview windows, summary information, instructions to download, and/or other methods of viewing the contents of a document. In the example of FIG. 7B, a pop-up window displays a document 720 or a preview of the document 720 as part of the user interface 700. However, the pop-up window is provided only by way of example and is not meant to be limiting.

Using any method to display the document 720, the system may record an amount of time during which the user interacts with the document 720. This may be referred to herein as "dwell time." Dwell time may include a time during which the document 720 is open by the user, such as a time between a file being opened or closed. Dwell time may also include an amount of time during which the document 720 is displayed on a display device and visible to the user. Dwell time in some embodiments may be limited to an amount of time during which a user actively interacts with the document 720, such as scrolling, hovering the mouse over the document, marking or editing the document, and so forth.

In general, some embodiments may use dwell time as a representation of implicit feedback. For example, the dwell time—using any of the definitions described above—may be recorded for the document 720, and the dwell time a be used as a measure to determine whether the similarity score assigned to the document 720 was accurate. For example, if the document 720 is associated with a larger dwell time above a threshold amount, it may be assumed that the document 720 is very similar to the input document, as the user spent more time reviewing the document 720 from the list of documents 702. This may be used to boost the similarity score by adjusting parameters in the configuration file as described below. Alternatively, if the dwell time is below a threshold amount, it may be assumed that the document 720 is not very similar to the input document, as the user quickly dismissed the document 720 without extensive review. This may be used to reduce the similarity score by adjusting parameters in the configuration file.

Some embodiments may also include mechanisms that allow a user to provide explicit feedback. Explicit feedback may include any type of feedback intentionally received from a user that identifies the document 720 as being relevant or not relevant to the input document. In this example, a "thumbs up" and "thumbs down" control 722 may be used to indicate whether the document was "helpful" or not. The control 722 is provided only by way of example, and is not meant to be limiting. Other examples of controls to receive intentional or explicit feedback may include allowing the user to enter a numerical score, selecting an emoji (e.g., frowning face, smiling face, etc.), receiving user comments or textual feedback, and so forth.

Figure 8:
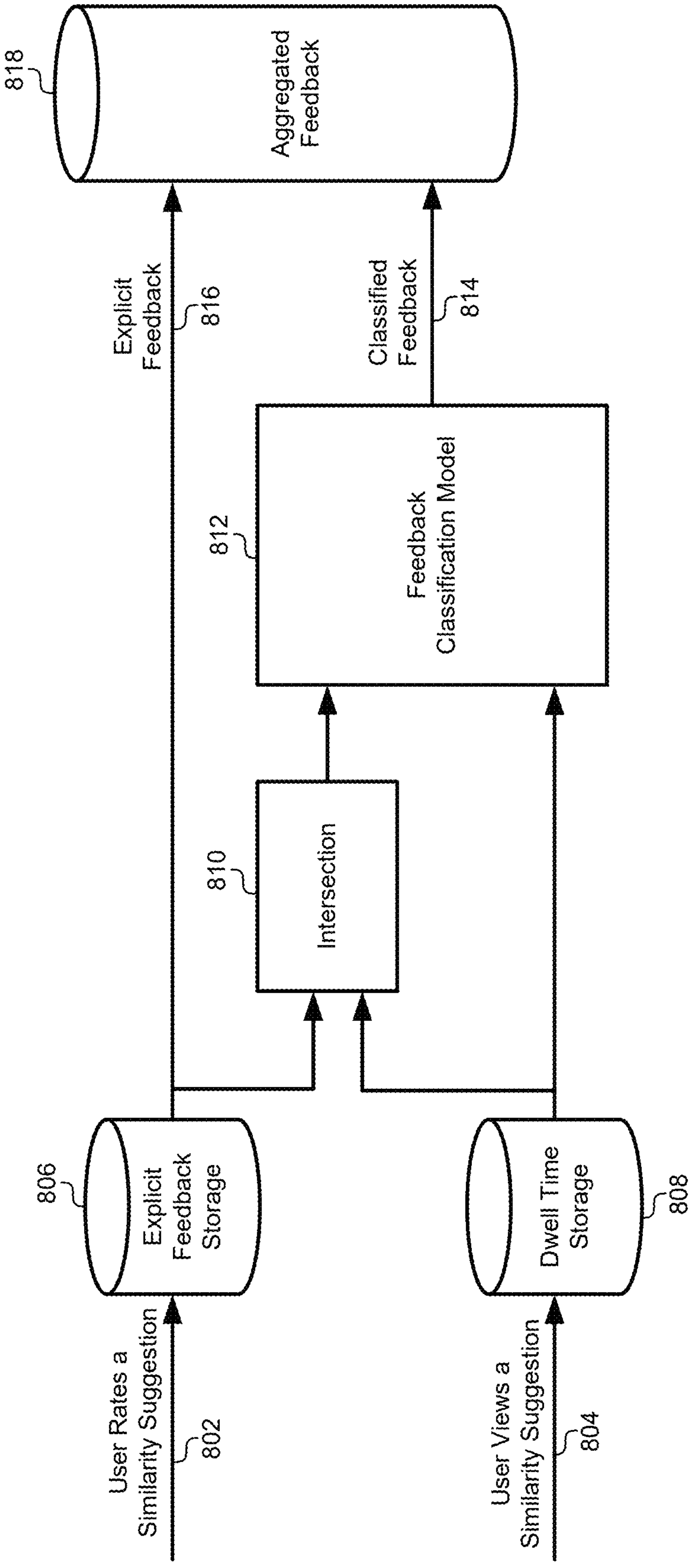
FIG. 8 illustrates how implicit and explicit feedback can be used to train a model to classify the aggregated feedback for documents with a similarity score, according to some embodiments.

FIG. 8 illustrates how implicit and explicit feedback can be used to train a model to classify the aggregated feedback for documents with a similarity score, according to some embodiments. In some cases, a user may view a document and provide both implicit and explicit feedback. For example, when viewing a document, a user may inherently provide implicit feedback 804 by viewing a document with a similarity score and having a dwell time recorded. Additionally, the user may provide explicit feedback 802 by submitting an input that indicates whether the document was useful/similar. Generally, explicit feedback 802 may take precedence over implicit feedback 804. For example, if a user quickly views a document and indicates that the document was very useful, the implicit feedback may suggest that the document was not useful. However, because the explicit feedback indicates that the document was useful, the explicit feedback may take precedence. The explicit feedback 802 may be used as a label or indication that the similarity score was correct or should be boosted for that document.

When a document is only associated with implicit feedback 804, it can be difficult to develop thresholds that properly characterize the dwell time in relation to the calculated similarity score. Instead of relying on thresholds or other user-defined evaluation methods, some embodiments may train a feedback classification model 812 to automatically learn how to categorize dwell times or other forms of implicit feedback. For example, the feedback classification model may include a supervised model, such as a Naïve Bayes model that classifies the implicit feedback 804 using the explicit feedback 802 as a label for the implicit feedback training data for a document. The feedback classification model 812 may be trained using documents that were explicitly rated by the user in order to later classify documents in which implicit feedback is recorded without corresponding explicit feedback.

In the example of FIG. 8, the intersection of the implicit feedback 804 and explicit feedback 802 for a document may be used as an input to train the feedback classification model 812. Any classification model may be used for the feedback classification model 812. The internal layers of the feedback classification model 812 may be trained to categorize dwell times as indicating whether the similarity score is accurate. In other words, the feedback classification model 812 may use intersections between explicit feedback 802 and implicit feedback 804 when they occur in order to train the feedback classification model 812 to recognize whether implicit feedback 804 indicates whether the similarity score is accurate.

After being trained, implicit feedback 804 may be provided to the feedback classification model 812, and the feedback classification model 812 may provide an output of classified feedback 814 that labels the implicit feedback 804. Both explicit feedback 816 and classified feedback 814 can be stored as aggregated feedback 818. For example, an entry in the aggregated feedback 818 may include a line indicating an identifier for the input or search document, an identifier of a recommended document having a calculated similarity score, and a feedback value that is either positive or negative. The implicit feedback 804 may be transformed by the feedback classification model 812 such that the classified feedback 814 matches the numerical format of the explicit feedback 816. For example, if the explicit feedback 816 includes binary "helpful/unhelpful" (0/1) values, then the classified feedback 814 may be similarly formatted. Note that user feedback need not be recorded in every case and is not mandatory. Therefore, some documents presented to users need not have a feedback value stored at all.

Figure 9:
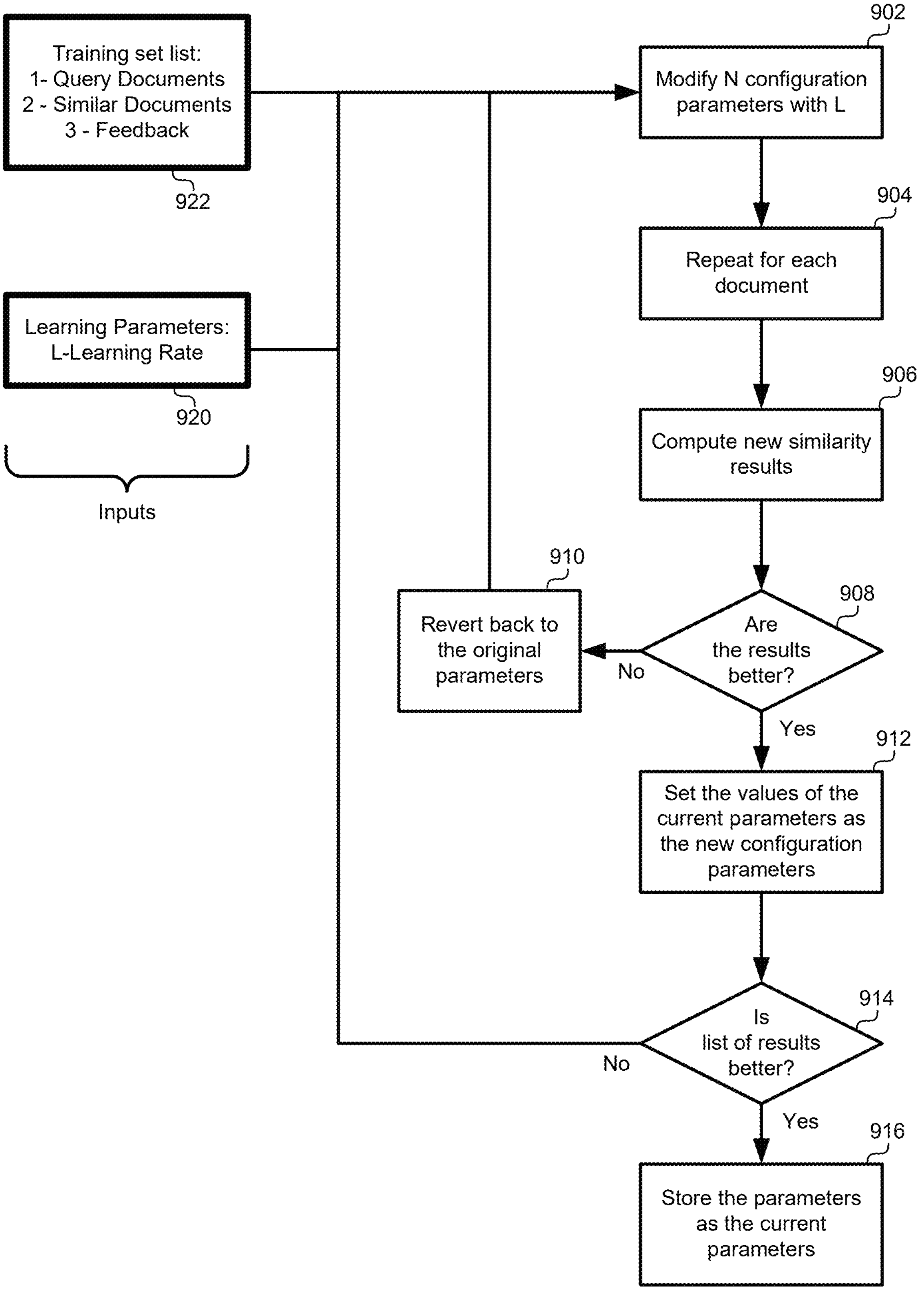
FIG. 9 illustrates an algorithm for adjusting the parameters of the configuration file to improve the accuracy of similarity score calculation using user feedback, according to some embodiments.

FIG. 9 illustrates an algorithm for adjusting the parameters of the configuration file to improve the accuracy of similarity score calculation using user feedback, according to some embodiments. As illustrated above in FIGS. 5A-5B, the configuration file may include a number of parameters that may be adjusted for each set of search queries that are generated for an input document. For example, while the source object, the source field, the target field, etc., may remain unchanged to correspond to the document classes and fields used to calculate the similarity score, other values may be adjusted to improve the accuracy of the similarity score. Parameters that may be adjusted may include the query type, the number of queries, and the weight assigned to each query.

For example, the query type (queryType) may be set to a fixed SINGLE_VALUE_FIELD for non-text fields. However, for text fields, varying numbers of "shingles" or n-grams may be used. A range of different integer numbers may be used for the shingle count, ranging from 1-SHINGLE, 2-SHINGLE, . . . , N-SHINGLE. Some embodiments may vary the values of the number of shingles between 1 and at most 4 words. This has been shown to provide accurate results without negatively affecting the throughput of the system. Using more than four words may be too specific, and thus unnecessarily lower the similar score.

In another example, some embodiments may vary the number of queries that are generated for each field. For example, the number of queries parameter (numberOfQueries) may be varied between 0, 1, 2, . . . , N queries. In some embodiments, the search space for the number of queries may use a Fibonacci sequence: 0, 1, 2, 3, 5, 8, 13, . . . for possible values during adjustment of this parameter. This has been shown to limit the search space, while still using a finer granularity at lower numbers of searches, which is inherent in the Fibonacci sequence.

Some embodiments may also vary the weight that is associated with the queries that are generated. Depending on the embodiment, the weight may be a numerical identifier within a defined range (e.g., 0.0 to 1.0, or 0 to 100, etc.) that indicates a boost or multiplier that should be applied to the similarity score generated by the search engine. Some embodiments may vary the weight that is applied within this numerical range to adjust the similarity score in response to user feedback.

FIG. 9 shows how these parameters may be altered using the labeled feedback to generate better similarity scores. The process may use various inputs 922 including the input document for the search, documents with calculated similarity scores found in response to the search, and/or the aggregated feedback described above in FIG. 8. Some embodiments may also use an input of a learning parameter (L) 920 that indicates a learning rate or how aggressive the algorithm should be in adjusting numerical parameters in the configuration file. These inputs may be provided to an iterative algorithm that may be referred to as a "learning to rank" (LTR) algorithm. The LTR algorithm may be executed off-line periodically at regular intervals, such as weekly, monthly, or when a predetermined threshold number of searches or feedback indications have been received. For example, since the model in FIG. 8 may be trained off-line, each training session of the model in FIG. 8 may trigger a training session for the LTR algorithm of FIG. 9.

The method may include modifying one or more of the configuration parameters described above (902), possibly using the learning parameter 920. In some embodiments, a single parameter may be altered at a time. Other embodiments may alter multiple parameters for each iteration. The learning parameter 920 may determine by how much each parameter is incremented. For example, some embodiments may randomly adjust a numerical parameter up or down using the learning parameter 920. If the learning parameter is 1, the number of queries may be adjusted up or down by 1. A more aggressive learning parameter 920 may adjust the number of queries up or down by 2, 3, 4, and so forth. The direction of change for each parameter may be determined randomly or may be determined based on a previous iteration of the algorithm illustrated in FIG. 9. For example, if randomly adjusting the number of queries up by 1 was shown to decrease the accuracy of the similarity score, then the following iteration may determinedly adjust the number of queries down by 1. In some embodiments, the learning parameter may be a value between 0.0 and 1.0 or a percentage between 0% and 100%, in which case, the value of the parameter may be adjusted according to that percentage applied to the range of values used for the parameter. This alteration of parameters in the configuration file may be repeated for each document (904) in the input set.

The method may include computing new similarity results for each input document (906). As described above, this may include generating one or more queries that are executed against the document collection or document repository to generate a set of similarity scores for documents in the document collection. In some cases, the queries may be run against a slightly different corpus compared with the original query run previously when the feedback was given. However, since the algorithm generally considers only a predetermined threshold number of top results (e.g., a top 10 list of results) small changes in the corpus may only minimally affected this LTR algorithm.

After rerunning the algorithm, a determination can be made as to whether the similarity results have improved for the documents in the document repository/collection with the updated parameters (908). This determination may be made by using an objective function to determine whether the current configuration generates better results than the previous configuration. Many different objective functions may be used to evaluate similarity scores. One particular objective function is provided here by way of example in equation (1) below.

$$\text{Error} = PosFound - PosMissed + NegMissed - NegFound \quad (1)$$

In Equation (1), the PosFound parameter may represent a number of positive feedback entries where the target document is found in the top M results returned by the similarity engine with the new configuration when using the source document as an input for the similarity computation (where M is an integer value, such as 10). The PosMissed parameter may represent a number of positive feedback entries that were not retrieved in the top M results with the current configuration. The NegMissed parameter may represent a number of negative feedback entries that were not retrieved in the top M results with the current configuration. The NegFound parameter may represent the number of negative feedback entries that were retrieved in the top M results with the current configuration. Note that equation (1) represents only a single objective expression to determine an error value. Other embodiments may use more advanced objective functions, such as Normalized Discounted Cumulative Gain (NDCG) or other functions.

The determination (908) may compare the current error value calculated by the objection function and compare this error value to an error value computed for a previous configuration. If the error of the current configuration is greater than the previous configuration (i.e., the results are worse), then the method may revert back to the original parameters of the previous configuration (910). Alternatively, if the error of the current configuration is less than the previous configuration (i.e., the results are better), then the method may set the current parameter values as the new configuration parameters (912). This determination essentially determines whether the adjustment of the parameters is moving in the right direction (e.g., up/down) or not.

With each iteration, the result set and/or error value can be compared to a threshold amount (914). Once the quality of the result set as measured by the objective function exceeds that threshold, the algorithm may store the current parameters as the parameters for the configuration going forward. During future runtime uses of the similarity score engine, the new configuration may be used to generate better similarity results. Alternatively, the LTR algorithm may continue to iterate (902) until the parameters have been adjusted sufficiently to generate the desired improvement represented by the threshold.

The LTR algorithm illustrated in FIG. 9 illustrates one method of improving the similarity scores by adjusting the configuration parameters. In some embodiments, an alternative method may be used for learning parameter adjustments to the configuration file using linear machine learning algorithms, such as linear regression. In order to use this method, the similarity engine may support a feature referred to as "explainability." This feature describes how the similarity engine may provide a way to retrieve internal statistics that were used in order to compute the final similarity score that drives the ordering of the results.

For example, a portion of a configuration file may comprised the following.

```
object: A
searchFields:
  name: TITLE
  type: text
  queries:
    queryType: 1-SHINGLE
    numberOfQueries: 10
    targetFields:
      targetField: TITLE
      object: A
      weight: 7
      targetField: CONTENT
      object: A
      weight: 10
    queryType: 3-SHINGLE
    numberOfQueries: 4
    targetFields:
      targetField: CONTENT
      object: A
      weight: 4
```

In this case for example the final score of the similarity computation would be: score=7*SCORE_A_TITLE_IN_A_TITLE_1_SHINGLE+10*SCORE_A_TITLE_IN_A_CONTENT_1_SHINGLE+4*SCORE_A_TITLE_IN_A_ CONTENT_3_SHINGLE. Therefore, for each query, the similarity engine computes the partial results for each comparison made in this equation. The final score may be generated by the summing or aggregating the partial scores. The "explainability" provided by the search engine can provide the partial results for each comparison described above.

This alternative method may consider these partial scores as "features" multiplied by a weight. Therefore, for each similarity query for which feedback is available, the system may extract the partial scores and the corresponding features generated by the search engine. For example, for a document pair (source_doc_1, target_doc_5), the source_doc_1={"TITLE": "pizza quattro formaggi without tomato souce", "CONTENT": "pizza bianca" } and target_doc_5={"TITLE": "pizza quattro formaggi", "CONTENT": "pizza with gorgonzola and without tomato sauce" }. Given a feedback line of (source_doc_1, target_doc_5, positive rating) and the above-mentioned configuration, the method may extract the similarity score of 65 from the similarity engine. Leveraging the explainability, the similarity engine may show that the score is composed of partial scores by query terms. Continuing with this example, the following may be retrieved from the similarity engine as an "explainedability" output: Score 65=7*TITLE: "pizza"+7*TITLE: "quattro"+7*TITLE: "formaggi"+10*CONTENT: "pizza"+10*CONTENT: "without"+10*CONTENT: "tomato"+10*CONTENT: "sauce"+4*CONTENT: "without tomato sauce".

This notation indicates that a partial score of 10 may be attributed to the term "tomato" found in the CONTENT of target_doc_5. When compared with the configuration file described above, the method can infer that the score is calculated using:

$$\begin{aligned}\text{Score} = {} & 7*\text{SCORE\_A\_TITLE\_IN\_A\_TITLE\_1\_SHINGLE} + \\ & 10*\text{SCORE\_A\_TITLE\_IN\_A\_CONTENT\_1\_SHINGLE} + \\ & 4*\text{SCORE\_A\_TITLE\_IN\_A\_CONTENT\_3\_SHINGLE}.\end{aligned}$$

Using numerical values, the Score=7*3+10*4+4*1=65, which implies that SCORE_A_TITLE_IN_A_ TITLE_1_SHINGLE=3, with the three matches being "pizza," "quattro," and "formaggi." Simliarly, SCORE_A_TITLE_IN_A_CONTENT_1_SHINGLE=4, with the four matches being "pizza," "without," "tomato," and "sauce." The SCORE_A_TITLE_IN_A_CONTENT_3_SHINGLE=1, with the one match being "without tomato sauce," which is a 3-shingle n-gram. In summary, the values of the following features have been inferred by this process when running the similarity search for source_doc_1:

SCORE_A_TITLE_IN_A_CONTENT_1_SHINGLE,

SCORE_A_TITLE_IN_A_CONTENT_1_SHINGLE

SCORE_A_TITLE_IN_A_CONTENT_3_SHINGLE.

This information may be used afterwards as an example in the training algorithm. Different linear algorithms (e.g., Linear Regression) may now be used to compute the weights. Using either of these two approaches above may be used to learn an optimal configuration of weights for the similarity engine. This allows the similarity engine to learn what fields are more important so that the lists of results that is presented to the user properly takes this into consideration.

Figure 10:
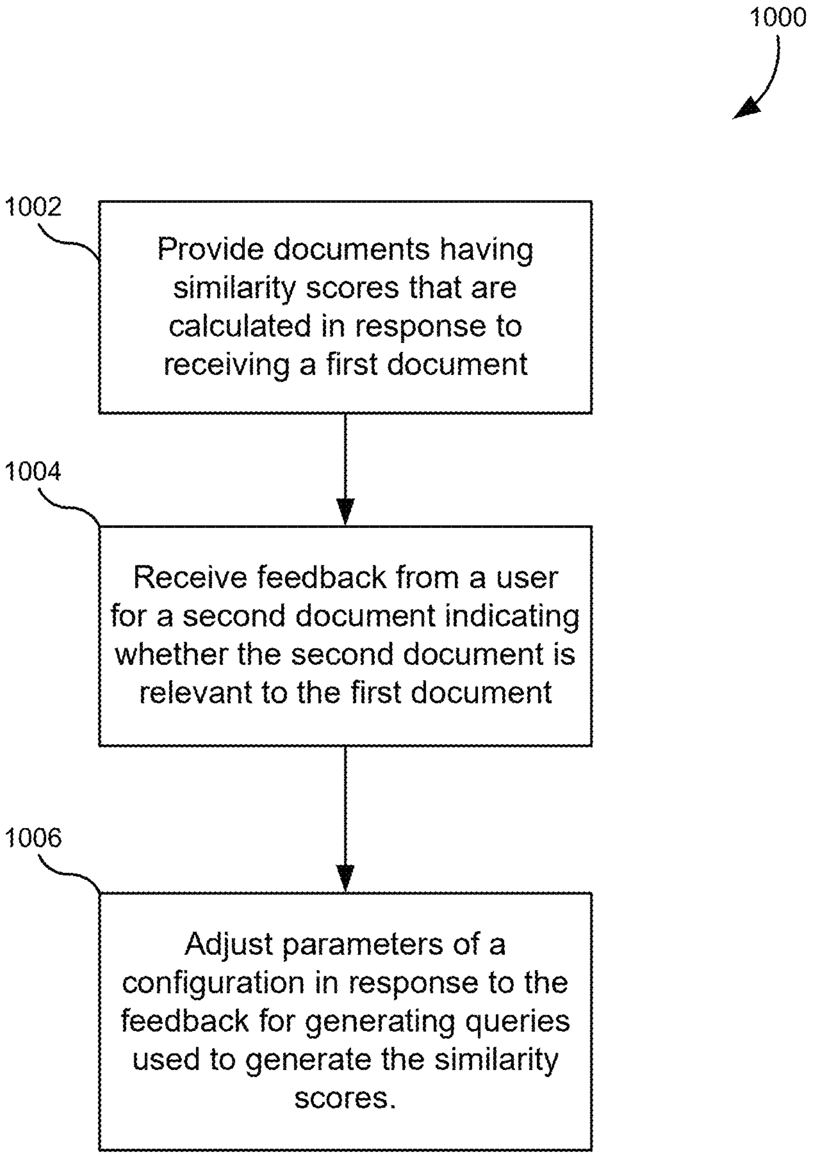
FIG. 10 illustrates a flowchart for using feedback to improve similarity scores for documents, according to some embodiments.

FIG. 10 illustrates a flowchart 1000 for using feedback to improve similarity scores for documents, according to some embodiments. The method may include providing a plurality of documents having similarity scores that are calculated in response to receiving a first document (1002). The similarity scores may indicate similarities between the first document and the plurality of documents. These scores may be generated by generating a plurality of search queries using a configuration based on a type of the first document as described above in FIGS. 1-6 and throughout this disclosure.

The method may also include receiving feedback from a user for a second document in the plurality of documents (1004). The feedback may indicate whether the second document is relevant to the first document. The feedback may include implicit feedback, such as a "dwell time." The feedback may also include explicit feedback, such as a user click on a control or other user interface element indicating if/how relevant the second document is to the first document. Feedback may be received as described above in FIGS. 7A-7B and throughout this disclosure.

The second document may be presented in a pop-up window that includes controls for receiving explicit user feedback. The second document may also be viewed in a standalone application, browser/app window, or other viewing interface. In some embodiments, the implicit feedback may be provided to a classification model that determines whether the implicit feedback indicates that the second document is relevant to the first document. The classification model may be trained using pairs of explicit and implicit feedback received from users as training data. For example, the explicit feedback may be used as a label for the implicit feedback in the training data. This model may be trained as described above in FIG. 8 and throughout this disclosure.

The method may further include adjusting parameters of a configuration in response to the feedback (1006). The configuration may define how to generate, from the first document, a plurality of queries used to generate the similarity scores for the plurality of documents. Various parameters may be adjusted, such as a parameter that indicates a number of shingles used when generating the plurality of queries, a parameter that indicates a number of queries generated, a parameter that indicates weights applied to the queries, and so forth. After the parameters have been adjusted, new similarity scores for the plurality of documents may be generated. These new similarity scores may then be compared to the previous similarity scores to determine whether adjusting the parameters of the configuration improved the search and resulting similarity scores. This determination may be made by evaluating an objective function representing a search error as described above. If the results are improved, the adjusted parameters may replace the previous parameters in the configuration for subsequent searches. If not, the configuration parameters may revert back to their previous values and other combinations or permutations of the configuration parameters may be adjusted until the results are improved. Parameters may be iteratively adjusted as described above in FIG. 9 and throughout this disclosure.

Computing System

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 11:
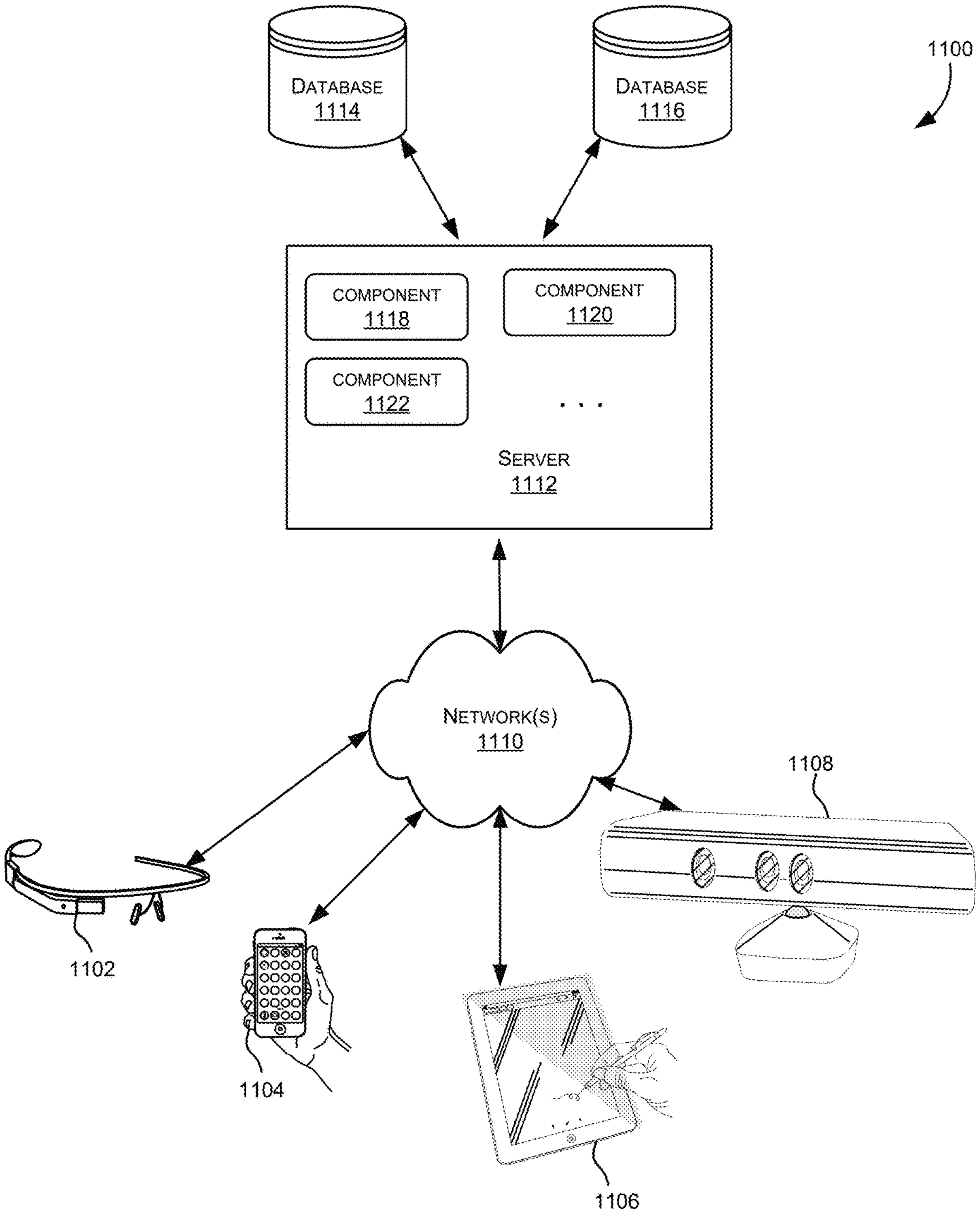
FIG. 11 illustrates a simplified block diagram of a distributed system for implementing some of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
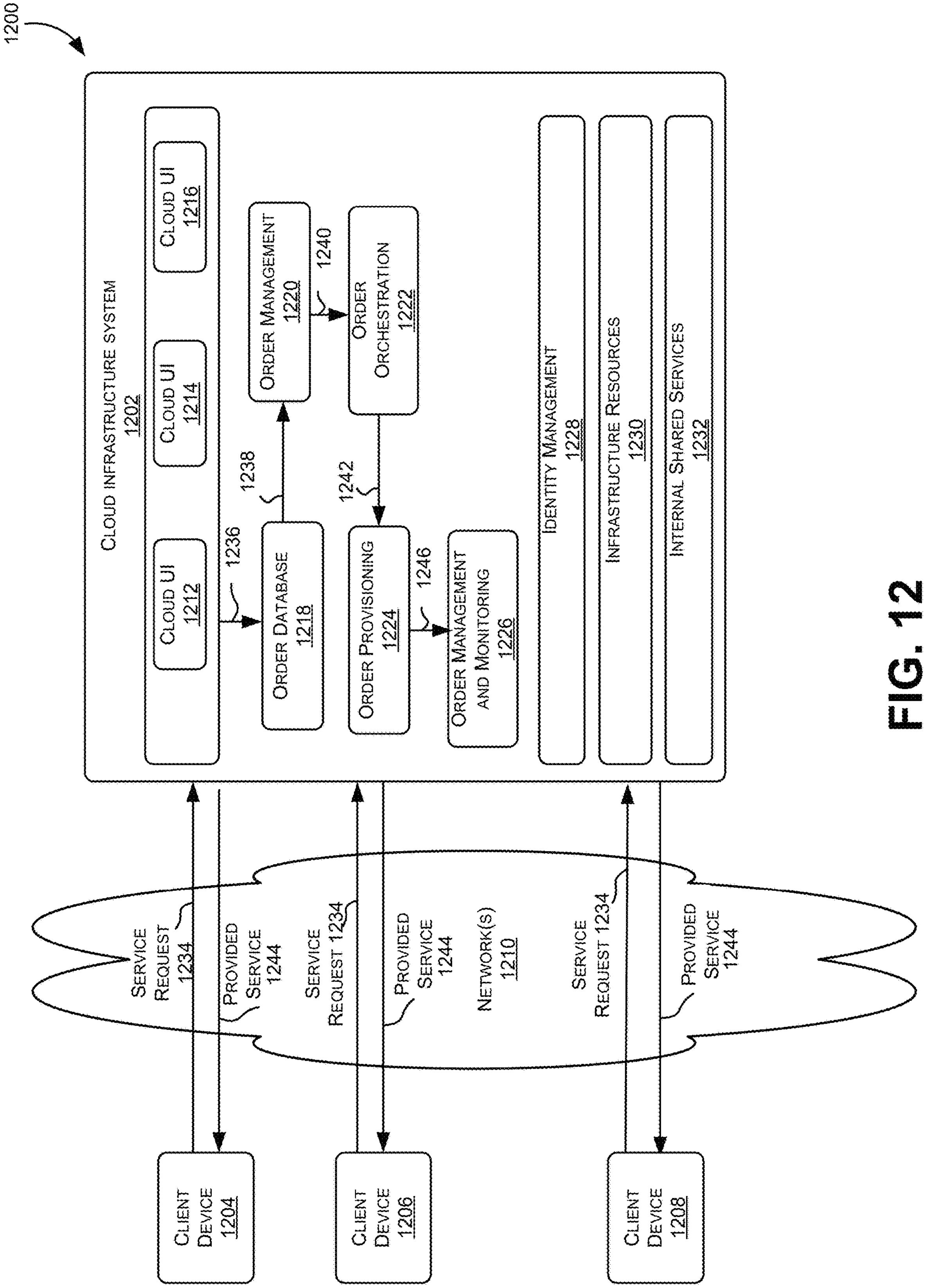
FIG. 12 illustrates a simplified block diagram of components of a system environment by which services provided by the components of an embodiment system may be offered as cloud services.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the system shown in the figure is only one example of a cloud infrastructure system that may incorporate some embodiments. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network that can support data communications using any of a variety of commercially-available protocols, including those described above for network(s) 1110.

Cloud infrastructure system 1202 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 13:
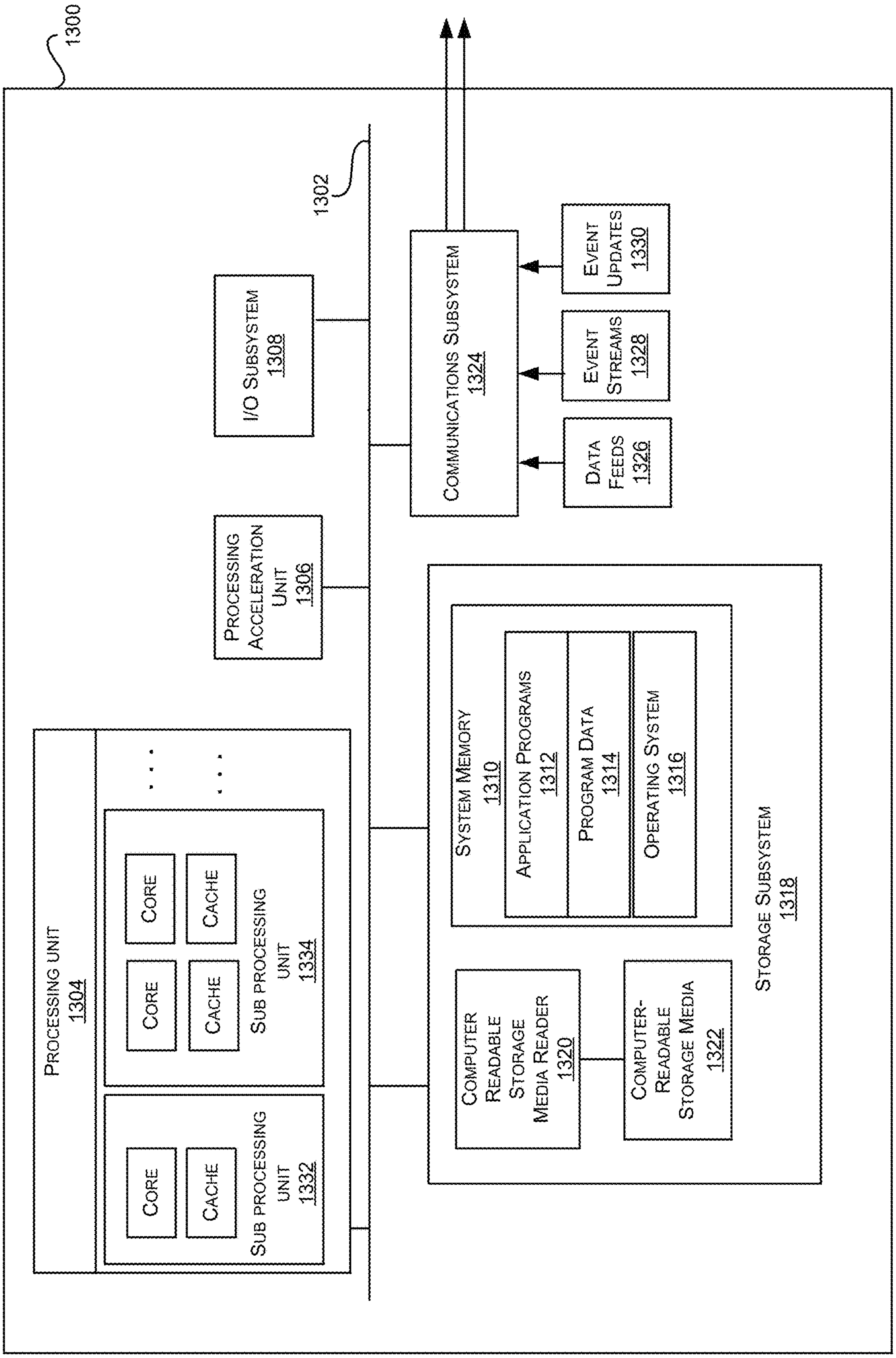
FIG. 13 illustrates an exemplary computer system, in which various embodiments may be implemented.

FIG. 13 illustrates an exemplary computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with some embodiments.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:

receiving feedback for a second document in a plurality of documents, wherein the feedback comprises:

implicit feedback recorded as a user views the second document; and explicit feedback provided from the user indicating whether the user believes the second document is relevant to a first document in the plurality of documents;

providing the implicit feedback to a classification model that determines whether the implicit feedback indicates that the second document is relevant to the first document, wherein the classification model is trained using previous explicit feedback labeling previous implicit feedback;

adjusting parameters of a configuration based on the explicit feedback together with an output from the classification model based on the implicit feedback wherein the configuration defines how to generate, from the first document, a plurality of queries used to generate similarity scores for the plurality of documents; and using the adjusted parameters of the configuration to generate a plurality of queries, and executing the plurality of queries into a document repository.

2. The non-transitory computer-readable medium of claim 1, wherein the implicit feedback comprises a dwell time.

3. The non-transitory computer-readable medium of claim 2, wherein the classification model determines whether a dwell time indicates that the second document is relevant to the first document.

4. The non-transitory computer-readable medium of claim 1, wherein the operations further comprise:

providing a plurality of documents having similarity scores that are calculated in response to receiving a first document, wherein the similarity scores indicate similarities between the first document and the plurality of documents.

5. The non-transitory computer-readable medium of claim 1, wherein the operations further comprise training the classification model using the implicit feedback as training data and the explicit feedback as a label for the training data.

6. The non-transitory computer-readable medium of claim 1, wherein the operations further comprise generating a pop-up window with a display of the second document.

7. The non-transitory computer-readable medium of claim 6, wherein the pop-up window comprises a control that allows the user to provide explicit feedback for the second document.

8. The non-transitory computer-readable medium of claim 1, wherein the parameters of the configuration comprise a parameter that indicates a number of shingles used when generating the plurality of queries.

9. The non-transitory computer-readable medium of claim 1, wherein the parameters of the configuration comprise a parameter that indicates a number of queries generated when generating the plurality of queries.

10. The non-transitory computer-readable medium of claim 1, wherein the parameters of the configuration comprise a parameter that indicates weights applied to the plurality of queries.

11. The non-transitory computer-readable medium of claim 1, wherein the parameters of the configuration comprise a learning parameter that controls how much the parameters of the configuration are adjusted in response to the feedback.

12. The non-transitory computer-readable medium of claim 1, wherein the operations further comprise:

generating new similarity scores for the plurality of documents after adjusting the parameters of the configuration.

13. The non-transitory computer-readable medium of claim 12, wherein the operations further comprise:

comparing the new similarity scores to the similarity scores to determine whether adjusting the parameters of the configuration improves the new similarity scores.

14. The non-transitory computer-readable medium of claim 13, wherein determining whether adjusting the parameters of the configuration improves the new similarity scores comprises:

evaluating an objective function representing a search error.

15. The non-transitory computer-readable medium of claim 13, wherein the operations further comprise:

reverting back to original parameters of the configuration when adjusting the parameters of the configuration does not improve the new similarity scores.

16. The non-transitory computer-readable medium of claim 13, wherein the operations further comprise:

using adjusted parameters of the configuration when performing subsequent searches of the plurality of documents for documents of a same type as the first document when adjusting the parameters of the configuration improves the new similarity scores.

17. A system comprising:

one or more processors; and one or more memory devices comprising instructions that, when executed by the one or more processors, cause the one or more processors to perform operations comprising:

receiving feedback for a second document in a plurality of documents, wherein the feedback comprises:

implicit feedback recorded as a user views the second document; and explicit feedback provided from the user indicating whether the user believes the second document is relevant to a first document in the plurality of documents;

providing the implicit feedback to a classification model that determines whether the implicit feedback indicates that the second document is relevant to the first documents wherein the classification model is trained using previous explicit feedback labeling previous implicit feedback;

adjusting parameters of a configuration based on the explicit feedback together with an output from the classification model based on the implicit feedback, wherein the configuration defines how to generate, from the first document, a plurality of queries used to generate similarity scores for the plurality of documents; and using the adjusted parameters of the configuration to generate a plurality of queries, and executing the plurality of queries into a document repository.

18. A method of using feedback to improve similarity scores for documents, the method comprising:

receiving feedback for a second document in a plurality of documents, wherein the feedback comprises:

implicit feedback recorded as a user views the second document; and explicit feedback provided from the user indicating whether the user believes the second document is relevant to a first document in the plurality of documents;

providing the implicit feedback to a classification model that determines whether the implicit feedback indicates that the second document is relevant to the first document, wherein the classification model is trained using previous explicit feedback labeling previous implicit feedback;

adjusting parameters of a configuration based on the explicit feedback together with an output from the classification model based on the implicit feedback, wherein the configuration defines how to generate, from the first document, a plurality of queries used to generate similarity scores for the plurality of documents; and using the adjusted parameters of the configuration to generate a plurality of queries, and executing the plurality of queries into a document repository.

* * * * *